United States Patent
Kageyama et al.

(10) Patent No.: US 9,857,100 B2
(45) Date of Patent: Jan. 2, 2018

(54) HEAT COLLECTOR FOR SOLAR THERMAL POWER GENERATION

(71) Applicant: TYK CORPORATION, Minato-ku, Tokyo (JP)

(72) Inventors: Taketomo Kageyama, Tajimi (JP); Yasuta Koike, Tajimi (JP)

(73) Assignee: TYK CORPORATION, Minato-ku, Tokyo (JP)

(*) Notice: Subject to any disclaimer, the term of this patent is extended or adjusted under 35 U.S.C. 154(b) by 219 days.

(21) Appl. No.: 14/760,594

(22) PCT Filed: May 17, 2013

(86) PCT No.: PCT/JP2013/063846
§ 371 (c)(1),
(2) Date: Jul. 13, 2015

(87) PCT Pub. No.: WO2014/184961
PCT Pub. Date: Nov. 20, 2014

(65) Prior Publication Data
US 2016/0061492 A1 Mar. 3, 2016

(51) Int. Cl.
*F24J 2/46* (2006.01)
*F24J 2/04* (2006.01)
(Continued)

(52) U.S. Cl.
CPC .......... *F24J 2/4654* (2013.01); *F24J 2/0488* (2013.01); *F24J 2/07* (2013.01); *F24J 2/4652* (2013.01);
(Continued)

(58) Field of Classification Search
CPC .... F24J 2/0488; F24J 2/07; F24J 2/484; F24J 2/4654; F24J 2/4652; F24J 2002/4685; Y02E 10/44; Y02E 10/41
See application file for complete search history.

(56) References Cited

U.S. PATENT DOCUMENTS 4,372,373 A * 2/1983 Haugeneder .............. E04B 1/74
126/400
2004/0261663 A1 12/2004 Yamada
(Continued)

FOREIGN PATENT DOCUMENTS

| JP | 2005-015728 A | 1/2005 |
| JP | 2012-092688 A | 5/2012 |

(Continued)

OTHER PUBLICATIONS

International Search Report for International Patent Application No. PCT/JP2013/063846 dated Jun. 18, 2013.

*Primary Examiner* — Alfred Basichas
(74) *Attorney, Agent, or Firm* — Ken I. Yoshida (57) ABSTRACT

There is provided a heat collector for solar thermal power generation that suppresses oxidization using a silicon-carbide ceramic sintered body as a base body. The heat collector includes the base body made of a silicon-carbide ceramic sintered body in which channels (cells) for passing through a heat medium are formed, a first glass layer of silicate glass that coats at least a part of surfaces of the base body and contains an alkali metal constituent and/or an alkaline-earth metal constituent, and a second glass layer of silicate glass that coats the first glass layer and has a sum of contents of an alkali metal constituent and an alkaline-earth metal constituent, which is smaller than a sum of contents of the alkali metal constituent and the alkaline-earth metal constituent in the first glass layer.

8 Claims, 5 Drawing Sheets

(51) Int. Cl.
*F24J 2/07* (2006.01)
*F24J 2/48* (2006.01)
(52) U.S. Cl.
CPC ........ *F24J 2/484* (2013.01); *F24J 2002/4685* (2013.01); *Y02E 10/41* (2013.01); *Y02E 10/44* (2013.01)

(56) References Cited

U.S. PATENT DOCUMENTS

2013/0233302 A1   9/2013  Majima
2013/0233303 A1   9/2013  Majima

FOREIGN PATENT DOCUMENTS

JP      2012-093004 A   5/2012
WO    2013/046732 A1   4/2013

\* cited by examiner

HEAT COLLECTOR FOR SOLAR THERMAL POWER GENERATION

BACKGROUND OF THE INVENTION

1. Field of the Invention

The present invention relates to a heat collector for solar thermal power generation.

2. Description of the Related Art

Solar thermal power generation is a technique of collecting solar light into a heat collector using a mirror and a lens, heating a heat medium in the heat collector, and rotating a turbine with steam generated by thermal exchange with the heated heat medium so as to generate power. Conventionally, a heat collector for solar thermal power generation using silicon carbide ceramics has been proposed (for example, see Patent Document 1: Japanese Patent Application Laid-open No. 2012-92688). The heat collector made of ceramics has an advantage that it is excellent in heat resistance in comparison with a heat collector made of a metal. In particular, silicon carbide ceramics has a high heat conductivity and a low thermal expansion coefficient. Therefore, the silicon carbide ceramics is excellent in thermal shock resistance and is appropriate as a heat collector the temperature of which becomes extremely high with light collection of solar light.

There is, however, a problem that silicon carbide is oxidized when heated to a high temperature under presence of oxygen. It is said that when the surface of silicon carbide is covered by a film of silicon dioxide generated by oxidation of silicon carbide, further oxidation is suppressed to some extent. However, the suppression of oxidation with the film of silicon dioxide is insufficient in fact.

SUMMARY OF THE INVENTION

The present invention has been made in view of the above-mentioned circumferences and an object thereof is to provide a heat collector for solar thermal power generation in which oxidation is suppressed while using a silicon-carbide ceramic sintered body as a base body.

In order to achieve the above-mentioned object, a heat collector for solar thermal power generation (hereinafter, simply referred to as "heat collector" in some cases) according to an aspect of the invention includes "a base body made of a silicon-carbide ceramic sintered body in which a channel for passing through a heat medium is formed, a first glass layer of silicate glass that coats at least a part of surfaces of the base body and contains an alkali metal constituent and/or an alkaline-earth metal constituent, and a second glass layer of silicate glass that coats the first glass layer and has a sum of contents of an alkali metal constituent and an alkaline-earth metal constituent, which is smaller than a sum of contents of the alkali metal constituent and the alkaline-earth metal constituent in the first glass layer."

Examples of the "base body in which a channel for passing through a heat medium is formed" include a honeycomb structure, which will be described later, a block-like structure in which a penetrating pore is pierced, a cylindrical structure, and a structure in which a plurality of cylinders are bonded while long-axis directions thereof are aligned.

The "first glass layer of silicate glass" can be formed by coating surfaces of the base body with a coating agent (hereinafter, referred to as "first coating agent") containing an alkali metal constituent such as sodium oxide, potassium oxide and potassium carbonate, and an alkaline-earth metal constituent such as calcium oxide and calcium carbonate in addition to silicon dioxide, and then, heating the coating agent so as to vitrify it. It should be noted that the first glass layer may contain one of or both of the alkali metal constituent and the alkaline-earth metal constituent.

The "first glass layer" can be made to contain, in addition to silicon dioxide and the alkali metal constituent and/or the alkaline-earth metal constituent, silicon (simple substance), boron oxide, aluminum oxide, and the like. A thermal expansion coefficient of the silicate glass can be adjusted by a content of boron oxide. Strength of the silicate glass can be adjusted by a content of aluminum oxide.

The "second glass layer" and a coating agent (hereinafter, referred to as "second coating agent") as a base thereof can contain the same constituents as those in the first glass layer and the first coating agent, respectively. Note that the sum of the contents of the alkali metal constituent and the alkaline-earth metal constituent in the second glass layer is smaller than that in the first glass layer.

The "surfaces of the base body" that are coated by the first glass layer include inner circumferential surface of the channel for passing through the heat medium.

When solar light is collected into the heat collector, the temperature of the heat collector becomes high. The base body of the heat collector is the silicon-carbide ceramic sintered body in the aspect of the invention, and silicon carbide is oxidized by being heated to a high temperature under presence of oxygen. To deal with this, in the heat collector in the aspect of the invention, the surfaces of the base body are covered by the first glass layer and the second glass layer of the silicate glass. Therefore, the layers of the silicate glass interfere contact between silicon carbide and oxygen, thereby effectively suppressing oxidation of silicon carbide.

The alkali metal constituent and the alkaline-earth metal constituent melt or soften silicon dioxide under heating. Therefore, the first coating agent as a base for forming the first glass layer is molten or softened after coating the surfaces of the base body and heating it. This causes the first coating agent to preferably adhere to the surfaces of the base body, so that the first glass layer after vitrified is firmly fixed to the base body made of a different material. When the base body is porous, the molten or softened first coating agent enters the opening pores sufficiently and is solidified so as to densify the base body. This densification increases thermal capacity of the base body and makes efficiency of thermal exchange with the heat medium high.

Meanwhile, the first glass layer containing the alkali metal constituent and/or the alkaline-earth metal constituent is molten or softened even under a high-temperature environment when the heat collector is used for the solar thermal power generation. Therefore, if an outermost layer of the heat collector is the first glass layer, there arise a risk that the heat collector adheres to a casing containing the heat collector or a plurality of heat collectors contained in a casing adhere to each other due to melting or softening of the first glass layer. In order to avoid this situation, in the aspect of the invention, the second glass layer coats the surfaces of the first glass layer. The sum of the contents of the alkali metal constituent and the alkaline-earth metal constituent in the second glass layer is smaller than that in the first glass layer, so that the second glass layer is not easy to be molten or softened even under a high temperature. The second glass layer, therefore, suppresses adhesion between a heat collector and its casing or adhesion between a plurality of heat collectors contained in a casing. Accordingly, when the heat collector is deteriorated or damaged with use, an operation of detaching the heat collector from the casing and an operation of exchanging only a part of the plurality of heat collectors can be performed easily.

Although the second coating agent as a base of the second glass layer is not molten or softened as much as the first coating agent is in heating processing after coating, the second glass layer is a layer of the silicate glass like the first glass layer. Therefore, unlike the case where the first glass layer is coated by a different material, the second glass layer is firmly fixed to the first glass layer even when it is not molten or softened so much under heating.

In addition, the silicate glass containing the alkali metal constituent and/or the alkaline-earth metal constituent softens and spreads under a high temperature so as to be plastically deformed. Therefore, even when cracks are generated on the base body made of ceramics as a brittle material, the first grass layer coating the surfaces of the base body is softened to fill the cracks, thereby suppressing breakage due to extension of the cracks. Accordingly, the heat collector in the aspect of the invention is formed by silicon carbide ceramics having high thermal shock resistance and further includes the first glass layer so as to be excellent in thermal shock resistance and have high mechanical strength under a high temperature.

In the heat collector for solar thermal power generation according to the aspect of the invention, it is preferable that "the sum of the contents of the alkali metal constituent and the alkaline-earth metal constituent in the second glass layer be equal to or lower than 3.6% by mass in terms of oxide" in the above-mentioned configuration.

The sum of the contents of the alkali metal constituent and the alkaline-earth metal constituent in the second glass layer is set to be in the above-mentioned range so as to effectively suppress the adhesion between a heat collector and its casing or the adhesion between a plurality of heat collectors contained in a casing as details thereof will be described later. It is considered that as the sum of the contents of the alkali metal constituent and the alkaline-earth metal constituent in the second glass layer is smaller, the silicate glass can be made more difficult to melt or soften at a high temperature.

In the heat collector for solar thermal power generation according to the aspect of the invention, it is preferable that "a plurality of base bodies be bonded through bonding layers so as to form a base body unit, and the first glass layer coats surfaces of the base body unit" in addition to the above-mentioned configuration.

In the heat collector having this configuration, the plurality of base bodies are bonded. Therefore, the overall heat collector can be increased in size regardless of the size of the individual base bodies. This can increase an amount of the heat medium with which the heat collector makes thermal exchange and increase solar thermal power generation efficiency.

Furthermore, the second glass layer coats the surfaces of the first glass layer coating the surfaces of the base body unit. Therefore, when the heat collector is used under a high-temperature environment, adhesion between the base body unit and its casing or adhesion of base body units to each other is suppressed by presence of the second glass layer. This configuration enables the base body unit to be exchanged as a unit when the heat collector is deteriorated or damaged with use.

In the heat collector for solar thermal power generation according to the aspect of the invention, it is preferable that "the base body has a honeycomb structure including a plurality of cells partitioned by partition walls extending in a single direction and aligned in rows and each cell configures the channel" in addition to the above-mentioned configuration.

The honeycomb structure has a large specific surface area. Therefore, the heat collector having this configuration has an advantage that thermal exchange efficiency thereof with the heat medium is high. It should be noted that a ceramic honeycomb structure is formed by extrusion normally and there is difficulty in producing a large-sized body by the extrusion forming. However, when the base body unit in which the plurality of base bodies are bonded configures the heat collector as described above, the overall heat collector can be increased in size even when each base bodies has a honeycomb structure.

As described above, there can be provided a heat collector for solar thermal power generation in which oxidation is suppressed while using a silicon-carbide ceramic sintered body as a base body as an effect of the present invention.

DESCRIPTION OF THE EMBODIMENTS

Hereinafter, a heat collector 1 as a first embodiment of the present invention will be described with reference to FIG. 1 to FIG. 5. The heat collector 1 in the first embodiment includes a base body 10 made of a silicon-carbide ceramic sintered body in which channels for passing through a heat medium are formed, a first glass layer 21 of silicate glass that coats at least apart of surfaces of the base body 10 and contains an alkali metal constituent and/or an alkaline-earth metal constituent, and a second glass layer 22 of silicate glass that coats the first glass layer 21 and has a sum of contents of an alkali metal constituent and an alkaline-earth metal constituent, which is smaller than a sum of contents of the alkali metal constituent and the alkaline-earth metal constituent in the first glass layer 21.

Figure 1:
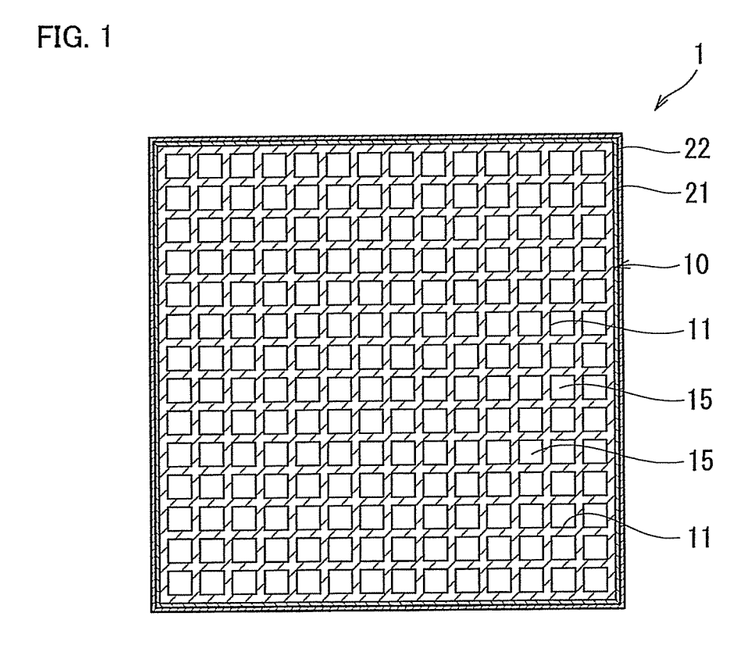
FIG. 1 is a transverse cross-sectional view of a heat collector according to a first embodiment of the invention.

In the above-mentioned configuration, the base body 10 of the heat collector 1 has a honeycomb structure including a plurality of cells 15 partitioned by partition walls 11 extending in a single direction and aligned in rows and the cells 15 configure the channels.

The heat collector 1 as described above can be manufactured by the following manufacturing method. That is to say, the method for manufacturing the heat collector 1 in the first embodiment includes a molding process of extruding a material which will be silicon-carbide ceramic by sintering through a die into a honeycomb structure including the plurality of cells 15 partitioned by the partition walls 11 extending in the single axial direction and aligned in rows, a sintering process of sintering the molded body under a non-oxidizing atmosphere so as to obtain the base body 10 made of the silicon-carbide ceramic sintered body, a first glass layer formation process of coating the surfaces of the base body 10 including the surfaces of the partition walls 11 with a first coating agent containing silicon dioxide, the alkali metal constituent, and/or the alkaline-earth metal constituent, and heating the base body 10 coated with the first coating agent so as to firmly fix the first coating agent to the surfaces of the base body 10 as the first glass layer 21 of silicate glass, and a second glass layer formation process of coating the surfaces of the first glass layer 21 with a second coating agent containing silicon dioxide and having the content of the alkali metal constituent and the alkaline-earth metal constituent, which is equal to or smaller than a predetermined value, and heating the base body 10 coated with the second coating agent so as to firmly fix the second coating agent to the surfaces of the first glass layer 21 as the second glass layer 22 having the sum of the contents of the alkali metal constituent and the alkaline-earth metal constituent, which is smaller than that in the first glass layer 21.

As is described more in detail, in the molding process, the material which will be silicon-carbide ceramic by sintering is mixed with water together with additives such a binder and a surfactant so as to form a kneaded plasticized compound, and then, the kneaded plasticized compound is extruded so as to obtain the molded body having the honeycomb structure. As the ceramic material which will be silicon-carbide ceramic by sintering, a material containing silicon carbide powder can be used. Alternatively, materials containing a silicon source and a carbon source, which produce silicon carbide by heating, can be used and the sintering (reaction-sintering) can be performed while producing silicon carbide by reaction.

When silicon carbide is reaction-sintered, silicon carbide powder as aggregate and a mixed material of the silicon source and the carbon source, which produce silicon carbide, can be used as the materials. A ratio of the silicon carbide powder as the aggregate is desirably 65% by mass to 95% by mass relative to the mixed material. When the ratio of the silicon carbide powder as the aggregate is lower than 65% by mass, strength of the sintered body tends to be low. On the other hand, when the ratio of the silicon carbide powder as the aggregate is higher than 95% by mass, there arises a risk that silicon carbide is difficult to be sintered. It is more desirable that the ratio of the silicon carbide powder as the aggregate relative to the mixed material is 75% by mass to 85% by mass with the above-mentioned confliction balanced.

As for the silicon source and the carbon source, which produce silicon carbide, silicon carbide is produced just in proportion stoichiometrically when a molar ratio (Si/C) between silicon and carbon is 1. It is desirable that Si/C is set to 0.5 to 1.5. When Si/C is lower than 0.5, an amount of unreacted carbon is too large, which can cause coarse pores and arise a risk that particle growth of produced silicon carbide is inhibited. On the other hand, when Si/C is larger than 1.5, an amount of silicon carbide that is produced is small and the reaction sintering tends to be insufficient. It is more desirable that Si/C is 0.8 to 1.2 without excess or shortage of silicon and carbon. Silicon nitride and silicon (simple substance) can be used as the silicon source and graphite, coal, coke, charcoal, and the like can be used as the carbon source. A drying process of drying the obtained molded body may be performed before the sintering process and after the molding process.

In the sintering process, the molded body is heated in the non-oxidizing atmosphere in a furnace and kept at a temperature of 1800° C. to 2300° C. for a certain period of time. If a sintering temperature is lower than 1800° C., the reaction sintering is insufficient possibly whereas if the sintering temperature is higher than 2350° C., silicon carbide is sublimed possibly. Setting of the sintering temperature to 2000° C. to 2200° C. enables the sintered body having sufficient strength to be obtained for a relatively short period of time and is more desirable. In this case, sintering time can be set to 30 minutes to 3 hours, for example, although it depends on the size of the molded body. The non-oxidizing atmosphere can be an inert gas atmosphere with argon, helium, or the like, a nitrogen gas atmosphere, a mixed gas atmosphere thereof, or a vacuum atmosphere. The base body 10 of the silicon-carbide ceramic sintered body having the honeycomb structure can be obtained with the above-mentioned processes.

After the sintering process and before the first glass layer formation process, a decarburization process can be provided in order to combustion-remove the carbon source that may be unreacted to produce silicon carbide in the sintering process. The decarburization process can be performed by heating the sintered body at the temperature at 600° C. to 1200° C. for 1 hour to 15 hours under an oxidizing atmosphere (air atmosphere). The heating temperature and the keeping time of these degrees hardly cause oxidation on silicon carbide in the decarburization process.

The "first glass layer formation process" is composed of a first coating process of coating the surfaces of the base body 10 with the first coating agent and a first vitrification process of heating the base body 10 coated with the first coating agent and firmly fixing the first coating agent to the surfaces of the base body 10 as the first glass layer 21 of silicate glass.

The first coating process can be a process of applying or spraying the first coating agent to the surfaces of the base body 10, or a process of immersing the base body 10 into the first coating agent. Furthermore, the first coating process can be a process of impregnating the base body 10 with the first coating agent when the base body 10 is porous.

When the base body 10 is impregnated with the first coating agent, first, the base body 10 is contained in a container capable of being hermetically sealed and the air in the container is sucked by a vacuum pump or the like. Then, the first coating agent is introduced into the hermetically sealed container through a pipe or a hose equipped with an opening/closing valve. With this, the outer surfaces of the base body 10 and the surfaces of the partition walls 11 are coated with the first coating agent and the first coating agent enters into the open pores of the partition walls 11.

The first coating agent forms the first glass layer 21 of silicate glass by heating, and a suspension having appropriate viscosity, which is obtained by adding an alkali metal constituent such as sodium oxide, potassium oxide and potassium carbonate, and an alkaline-earth metal constituent such as calcium oxide and calcium carbonate to silicon dioxide and adding water thereto, is used as the first coating agent. The first coating agent can be made to contain silicon (as a simple substance), boron oxide, aluminum oxide, aluminum hydroxide, and the like as other constituents. The degrees of melting or softening at the time of heating can be adjusted by the content of the alkali metal constituent and the alkaline-earth metal constituent so as to adjust the adhesiveness of the first coating agent to the surfaces of the base body 10 and the easiness of entering of the first coating agent into the opening pores. Furthermore, the thermal expansion coefficient of the silicate glass can be adjusted by the content of boron oxide. In addition, the strength of the silicate glass can be adjusted by the content of aluminum oxide and the content of aluminum hydroxide (which forms aluminum oxide by heating).

Furthermore, silicon carbide powder can be mixed to the first coating agent in addition to the above-mentioned constituents. Silicon carbide contained in the first coating agent is easier to be oxidized under heating to form silicon dioxide than silicon carbide which is the matrix of the sintered body. Then, silicon dioxide immediately after produced has higher reactivity than silicon dioxide originally contained in the first coating agent and is easy to be vetrified. Accordingly, the first coating agent is made to contain silicon carbide, so that the first glass layer 21 of the silicate glass can be efficiently formed in the first vitrification process.

In the first vitrification process, after the drying processing of removing moisture in the first coating agent coated the base body, heating in order to vetrify the first coating agent is performed. The heating can be performed by keeping the base body 10 coated with the first coating agent at a temperature of 800° C. to 1200° C. for 1 hour to 30 hours under the air atmosphere, for example. The first coating agent forms the silicate glass by the heating and is molten or softened so as to adhere to the surfaces of the base body 10 (surfaces of the partition walls 11 and the side surfaces). Thereafter, the silicate glass is solidified by subsequent cooling so as to form the densified first glass layer 21.

The "second glass layer formation process" is composed of a second coating process of coating the surfaces of the first glass layer 21 with the second coating agent and a second vitrification process of heating the base body 10 coated with the second coating agent and firmly fixing the second coating agent onto the first glass layer 21 as the second glass layer 22 of the silicate glass.

The second coating agent forms the second glass layer 22 of the silicate glass by heating and can be made to contain the same constituents as those in the first coating agent. The second coating agent is prepared such that the sum of the contents of the alkali metal constituent and the alkaline-earth metal constituent in the second glass layer 22 is smaller than that in the first glass layer 21.

The second coating process can be a process of applying or spraying the second coating agent to the surfaces of the first glass layer 21, or a process of immersing the base body 10 coated by the first glass layer 21 into the second coating agent.

Figure 2:
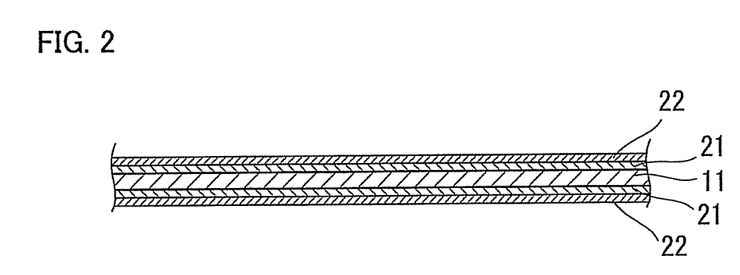
FIG. 2 is a cross-sectional view of a partition wall in the heat collector in FIG. 1.
Figure 3:
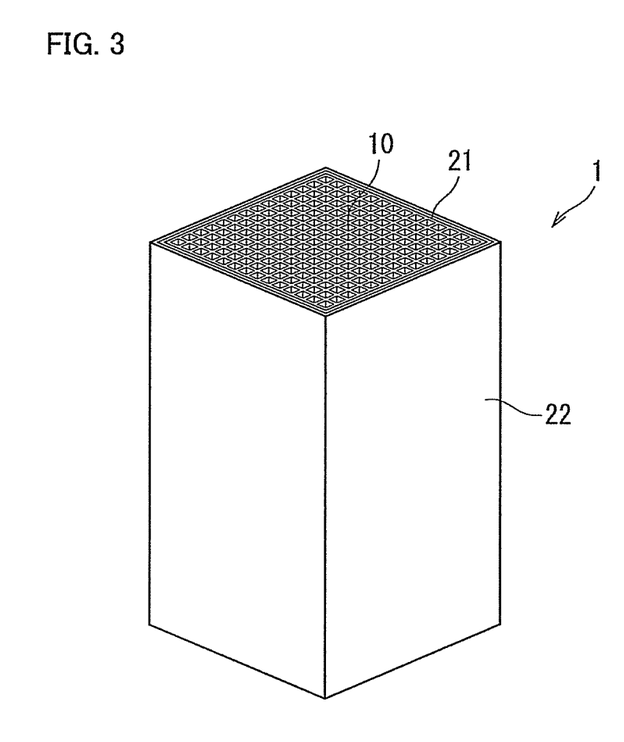
FIG. 3 is a perspective view of the heat collector in FIG. 1.

The second vitrification process can be performed in the same manner as the first vitrification process. With this process, the heat collector 1 in which the surfaces of the base body 10 are coated by the first glass layer 21 and the surfaces of the first glass layer 21 are coated by the second glass layer 22 is obtained. Note that the partition walls 11 having the honeycomb structure in the heat collector 1 have a laminated structure where the first glass layer 21 and the second glass layer 22 coat both side surfaces of the partition walls 11 as illustrated in FIG. 2.

Figure 4:
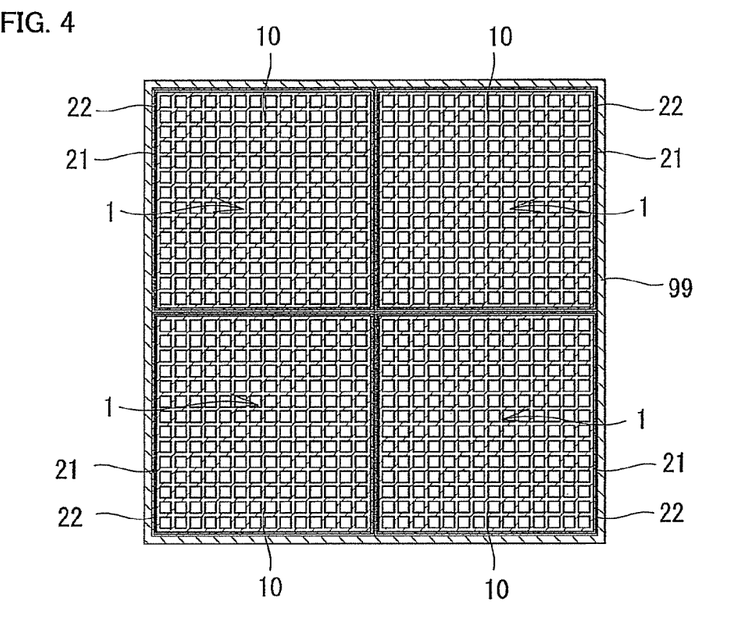
FIG. 4 is an example where a plurality of heat collectors in FIG. 1 are contained in a casing.
Figure 5:
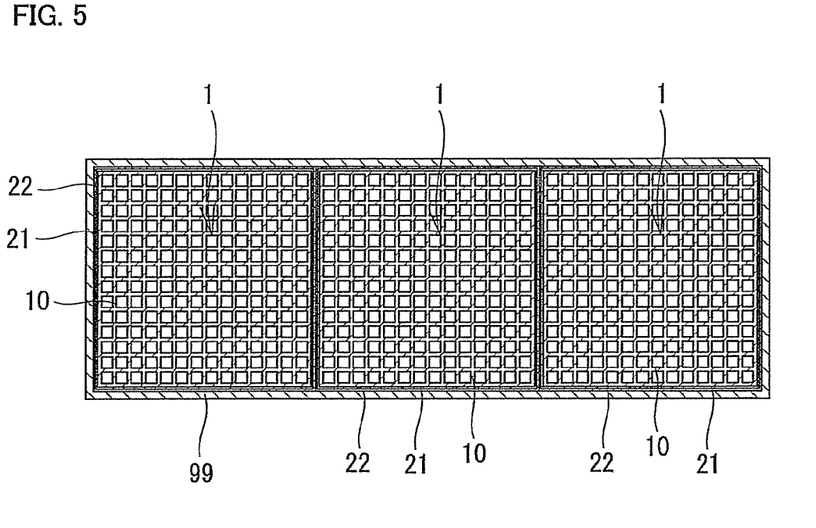
FIG. 5 is another example where a plurality of heat collectors in FIG. 1 are contained in a casing.

A plurality of heat collectors 1 manufactured by the above-mentioned processes can be contained in one casing 99 for use as illustrated in FIG. 4 and FIG. 5. FIG. 4 is an example where four heat collectors 1 are aligned in a form of 2 rows×2 columns and FIG. 5 is an example where three heat collectors 1 are aligned in a row. All the heat collectors 1 have a configuration in which the base body 10 made of the silicon-carbide ceramic sintered body is coated by the first glass layer 21 and the second glass layer 22 of the silicate glass. Therefore, oxidation of silicon carbide is effectively suppressed even when the heat collectors 1 are heated at a high temperature under presence of oxygen.

Furthermore, the outermost layer of each heat collector 1 is the second glass layer 22. The second glass layer 22 is the silicate glass having the sum of contents of the alkali metal constituent and the alkaline-earth metal constituent, which is smaller than that in the first glass layer 21. Therefore, the second glass layer 22 is not easy to be molten or softened at a high temperature. Accordingly, even when the plurality of heat collectors 1 are used at a high temperature in a state of being adjacent to each other, a risk that the adjacent heat collectors 1 adhere to each other is reduced by presence of the second glass layer 22. This enables an operation of detaching the heat collector 1 deteriorated or damaged with use from the casing 99 to be performed easily and the heat collector 1 configured by one base body 10 can be a unit for exchange.

Figure 6:
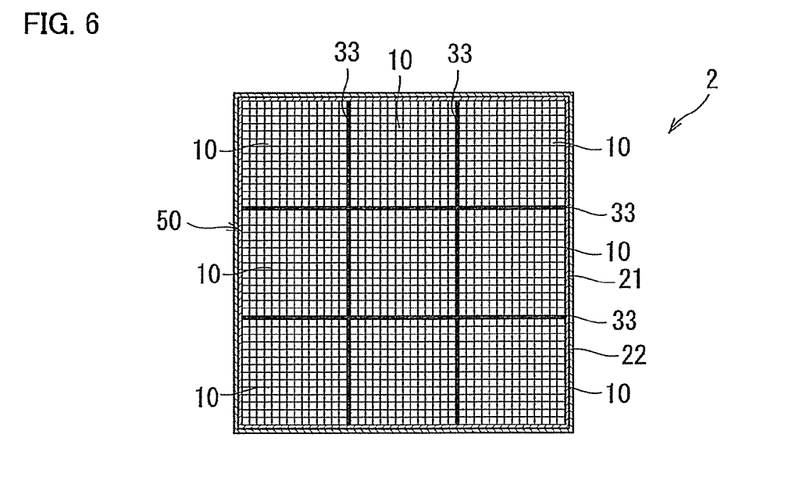
FIG. 6 is a transverse cross-sectional view of a heat collector according to a second embodiment of the invention.

Next, a heat collector 2 according to a second embodiment will be described with reference to FIG. 6 and FIG. 7. In the heat collector 2 in the second embodiment, the plurality of base bodies 10 made of the silicon-carbide ceramic sintered bodies that have honeycomb structures including the plurality of cells 15 partitioned by the partition walls 11 extending in the single direction and aligned in rows and in which the cells 15 configure the channels for passing through the heat medium are bonded through bonding layers 33 so as to form a base body unit 50, the first glass layer 21 coats the surfaces of the base body unit 50, and the second glass layer 22 coats the surfaces of the first glass layer 21. That is to say, in the second embodiment, the second glass layer 22 is the outermost layer of the base body unit 50. In the second embodiment, the same reference numerals denote the same components as those in the first embodiment and detail description thereof is omitted.

A method for manufacturing the heat collector 2 in the second embodiment is different from the method for manufacturing the heat collector 1 in the first embodiment in a point that after the sintering process, a bonding process of bonding the plurality of base bodies 10 with an a bonding agent so as to form the base body unit 50 is performed, and then, the first glass layer formation process and the second glass layer formation process are performed. That is to say, the molding process, the sintering process, the bonding process, the first glass layer formation process, and the second glass layer formation process are performed in this order.

In the "bonding process", the bonding agent is applied to the side surfaces of the base bodies 10 made of the silicon-carbide ceramic sintered bodies each having the honeycomb structure and the plurality of base bodies 10 are bonded so as to form the base body unit 50. As the bonding agent, for example, a bonding agent obtained by mixing coarse particle powder (average particle diameter of 5 μm to 100 μm) of silicon carbide, fine particle powder (average particle diameter of equal to smaller than 5 μm) of silicon carbide, an inorganic fiber such as a mullite fiber, and a binder (an inorganic binder such as colloidal silica and/or an organic binder such as carboxymethyl cellulose) can be used. After the bonding, the base body unit 50 is heat treated at a temperature of 80° C. to 100° C. and the binding agent is dried and solidified so as to form a bonding layer 33.

After the bonding process, the surfaces (side surfaces of the partition walls 11 and the base body unit 50) of the base body unit 50 are coated with the first coating agent (first coating process). Then, the base body unit 50 coated with the first coating agent is heated and the first coating agent is vitrified so as to form the first glass layer 21 (first vitrification process). Subsequently, the surfaces of the first glass layer 21 coating the surfaces of the base body unit 50 are coated with the second coating agent (second coating process). Then, the first glass layer 21 coated with the second coating agent is heated and the second coating agent is vitrified so as to form the second glass layer 22 (second vitrification process). With these processes, as illustrated in FIG. 6, the heat collector 2 in which the first glass layer 21 coats the surfaces of the base body unit 50 and the second glass layer 22 further coats the surfaces of the first glass layer 21 is formed. FIG. 6 illustrates the case where the base body unit 50 composed of nine base bodies 10 is coated by the first glass layer 21 and the second glass layer 22.

Figure 7:
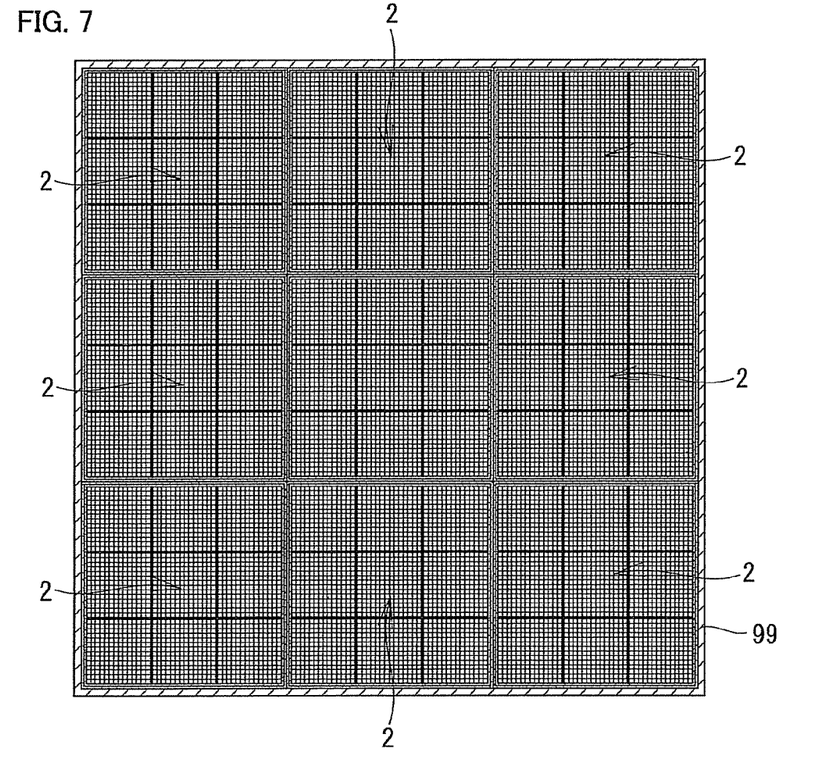
FIG. 7 is an example where a plurality of heat collectors in FIG. 6 are contained in a casing.

The plurality of heat collectors 2 as described above can be contained in one casing 99 for use as illustrated in FIG. 7. FIG. 7 is an example where the nine heat collectors 2 as illustrated in FIG. 6 are contained in one casing 99 in a form of 3 rows×3 columns. All the heat collectors 2 have a configuration in which the base body unit 50 as an assembly of the plurality of base bodies 10 made of the silicon-carbide ceramic sintered bodies is coated by the first glass layer 21 and the second glass layer 22 of the silicate glass. Therefore, oxidation of silicon carbide is effectively suppressed even when the heat collectors 2 are heated at a high temperature under presence of oxygen.

Furthermore, the outermost layer of each heat collector 2 is the second glass layer 22. The second glass layer 22 is the silicate glass having the sum of contents of the alkali metal constituent and the alkaline-earth metal constituent, which is smaller than that in the first glass layer 21. Therefore, the second glass layer 22 is not easy to be molten or softened at a high temperature. Accordingly, even when the plurality of heat collectors 2 are used at a high temperature in a state of being adjacent to each other, a risk that the adjacent heat collectors 2 adhere to each other is reduced by presence of the second glass layer 22. This enables an operation of detaching the heat collector 2 deteriorated or damaged with use from the casing 99 to be performed easily and the base body unit 50 can be a unit for exchange.

EXAMPLE

A mixed material having the following composition was mixed and kneaded with water, an organic binder, and a surfactant so as to form a kneaded plasticized compound, and the compound was extruded through a die to obtain a body having a honeycomb structure (molding process). The obtained body was sintered under the non-oxidizing atmosphere at a temperature of 2300° C. for 10 minutes so as to obtain a base body made of a silicon-carbide ceramic sintered body (sintering process). The base body having the honeycomb structure was formed in a quadrangular prism shape having the partition wall thickness of 0.4 mm and the size of 10 cm×10 cm×50 cm, and a cell density therein was set to 200 cell/square inch.

Composition of Mixed Material

Silicon carbide as aggregate (average particle diameter 12 μm): 75% by mass

Silicon nitride as silicon source (average particle diameter 10 μm): 20% by mass Graphite as carbon source (average particle diameter 15 μm): 5% by mass The base body after the sintering process was porous body having an average pore diameter of 12 μm and an apparent porosity of 42%. The average pore diameter was measured as a median diameter (diameter when a cumulative pore volume was 50% of a total pore volume) from pore diameter distribution measured by a mercury intrusion technique using a mercury porosimeter (manufactured by Micromeritics Instrument Corporation, Auto Pore IV9500). Furthermore, the apparent porosity was calculated based on a volume of the sample and a volume of mercury intruded into the sample under pressure when the average pore diameter was measured.

The base body was impregnated with the first coating agent and the surfaces of the base body were coated with the first coating agent. Thereafter, the base body was heated under the air atmosphere at a temperature of 1000° C. for 3 hours so as to form the first glass layer of the silicate glass (first glass layer formation process). On the base body coated by the first glass layer, the surfaces of the first glass layer were coated with the second coating agent and the base body was heated under the air atmosphere at a temperature of 1000° C. for 3 hours so as to form the second glass layer of the silicate glass (second glass layer formation process). Thus, the sample that experienced the first glass layer formation process and the second glass layer formation process was used as an example.

Note that a suspension obtained by mixing silicon dioxide, boron oxide, silicon (simple substance), silicon carbide, aluminum oxide, the alkali metal constituent and the alkaline-earth metal constituent, and other additional constituents with water was used as the first coating agent and a suspension obtained by mixing silicon dioxide, aluminum oxide, and other additional constituents with water was used as the second coating agent here. The sum of the contents of the alkali metal constituent and the alkaline-earth metal constituent in the silicate glass formed after the heating was 6.2% by mass in the first glass layer and was 1.2% by mass in the second glass layer in terms of oxide.

On the other hand, a sample of the base body after the sintering process on which both of the first glass layer formation process and the second glass layer formation process were not performed was used as a comparison example A.

Figure 8:
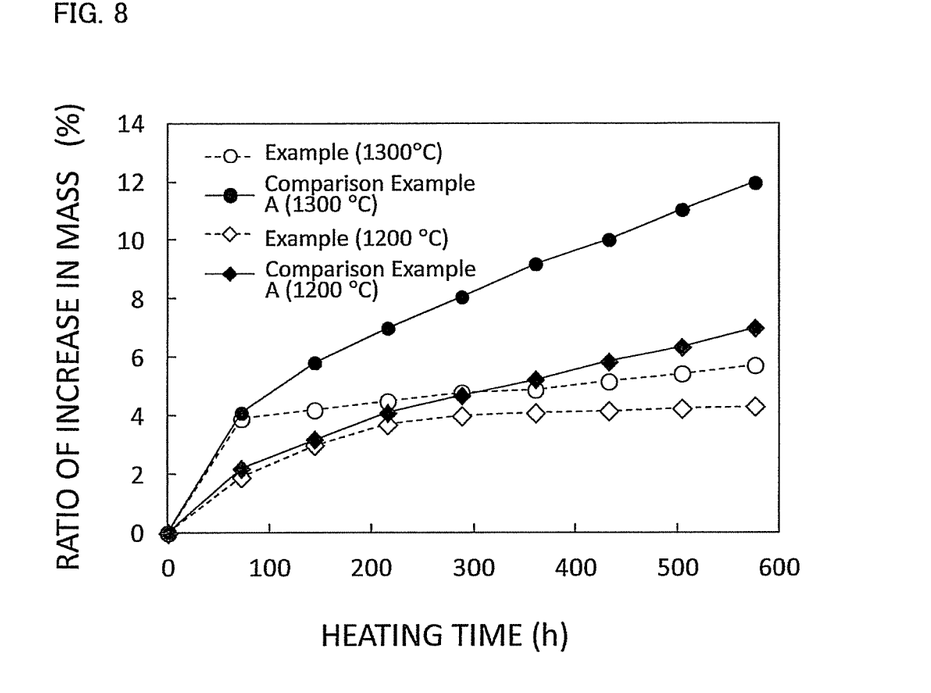
FIG. 8 is a graph illustrating increase in mass with increase in heating time by a change ratio relative to an initial mass for an example and comparison examples.

A heating test of evaluating the degree of oxidation of silicon carbide with heating under the air atmosphere based on increase in mass was performed on the example and the comparison example A. The heating test was performed in the following manner. That is, an operation of increasing the temperature to 1200° C. or 1300° C., keeping each sample at the temperature for 72 hours, and decreasing the temperature to a room temperature was performed eight times (total heating time 576 hours). Then, a mass of the sample was measured before and after each round of the heating test. FIG. 8 illustrates a graph illustrating change in mass with increase in the heating time as a ratio relative to an initial mass (mass before the heating test is started) for each sample.

First, in the case where the heating temperature was 1300° C., both the increases in mass in the example and the comparison example A were approximately 4% and were equivalent after the first heating test (72 hours). Thereafter, as the heating time was increased, the mass increased in the comparison example A having no silicate glass layer continuously whereas the mass hardly changed in the example including the silicate glass layers. The ratio of the increase in mass after the eighth round of the heating test was 12.0% in the comparison example A whereas it was 5.4% in the example.

Also in the case where the heating temperature was 1200° C., both the increases in mass in the example and the comparison example A were approximately 2% and were equivalent after the first heating test. Thereafter, as the heating time was increased, the mass increased in the comparison example A continuously whereas the mass hardly changed in the example. The ratio of the increase in mass after the eighth heating test was 7.0% in the comparison example A whereas it was 4.3% in the example.

A molecular weight of silicon carbide is 40 and a molecular weight of silicon dioxide is 60. Therefore, the mass increases by 20 g when silicon carbide of 1 mol is oxidized to form silicon dioxide of 1 mol. Accordingly, from the above-mentioned results as illustrated in FIG. 8, it was found that oxidation of silicon carbide was suppressed by the silicate glass layers (the first glass layer and the second glass layer) formed on the surfaces of the base body. In the example, silicon carbide is also contained in the impregnated first coating agent. Accordingly, the increase in mass in the above-mentioned heating test includes an increase in mass by oxidation of silicon carbide derived from the first coating agent. However, even when the increase in mass by oxidation of silicon carbide derived from the first coating agent is included, the ratio of the increase in mass relative to the initial mass in the example is lower than the ratio of the increase in mass relative to the initial mass in the comparison example A. Therefore, it is obvious that oxidation of silicon carbide of the base body is effectively suppressed in the example.

Next, results of tests for the difference in the adhesiveness between the heat collectors depending on the difference in the sum of the contents of the alkali metal constituent and the alkaline-earth metal constituent in the second glass layer or presence and absence of the second glass layer will be described. The tests were performed on samples 1 to 8 on which the second glass layer formation process was performed using the second coating agents having different sums of the contents of the alkali metal constituent and the alkaline-earth metal constituent and a comparison example B on which the second glass layer formation process was not performed after the first glass layer formation process using the first coating agent same as that as described above was performed on the base body obtained in the same manner as described above. The sums of the contents of the alkali metal constituent and the alkaline-earth metal constituent in the samples 1 to 8 were made different in a range of 6% by mass to 0.6% by mass in terms of oxide as indicated in Table 1.

TABLE 1

| SUM OF CONTENTS OF ALKALI METAL CONSTITUENT AND ALKALINE-EARTH METAL CONSTITUENT IN SECOND GLASS LAYER (% BY MASS) | ADHESIVENESS | | | | |
|---|---|---|---|---|---|
| SAMPLE 1 | 6.0 | x | x | x | x | x |
| SAMPLE 2 | 4.8 | x | ○ | x | x | x |
| SAMPLE 3 | 3.6 | x | x | ○ | ○ | x |
| SAMPLE 4 | 3.0 | ○ | ○ | ○ | ○ | ○ |
| SAMPLE 5 | 2.4 | ○ | ○ | ○ | ○ | ○ |
| SAMPLE 6 | 1.8 | ○ | ○ | ○ | ○ | ○ |
| SAMPLE 7 | 1.2 | ○ | ○ | ○ | ○ | ○ |
| SAMPLE 8 | 0.6 | ○ | ○ | ○ | ○ | ○ |
| COMPARISON EXAMPLE B | NO SECOND GLASS LAYER | x | x | x | x | x |

The test for the adhesiveness was performed as follows. Two same samples were stacked while the side surfaces thereof were made to abut against each other and were heated in this state under the air atmosphere at a temperature of 1300° C. for 576 hours. After the temperature was decreased to the room temperature, the case where the two stacked samples could be separated easily was evaluated as "○" and the case where the two samples adhered to each other and could not be separated from each other was evaluated as "x". The test was performed five times on each sample. The test results are also indicated in Table 1.

As indicated in Table 1, in the case of the comparison example B having no second glass layer, the two samples firmly adhered to each other and could not be separated from each other. It was considered that this result was obtained because the first glass layer was molten or softened at a high temperature and the two samples were firmly fixed in solidification at the time of cooling. On the other hand, the adhesiveness was improved in the case of the samples having the second glass layer. By taking into account the fact that an actual usage temperature of the heat collector is 1000° C. to 1100° C. and it is lower than the test temperature, it has been considered that the adhesion between the adjacent heat collectors can be suppressed when the sum of the contents of the alkali metal constituent and the alkaline-earth metal constituent is equal to or lower than 3.6% by mass in terms of oxide.

Furthermore, evaluations for all the tests performed on the samples 4 to 8 were "○". Based on these evaluations, it was confirmed that the adhesion between the adjacent heat collectors could be suppressed more reliably when the sum of the contents of the alkali metal constituent and the alkaline-earth metal constituent in the second glass layer was at least within a range of 0.6% by mass to 3.0% by mass in terms of oxide.

Although the invention has been described using the preferable embodiment hereinbefore, the invention is not limited to the above-mentioned embodiment and various improvements and changes in design can be made in a range without departing from a scope of the invention as will described below.

For example, although the shape of the base body 10 is a quadrangular prism as illustrated in the drawing in the above-mentioned embodiment, the shape of the base body is not limited thereto and may be a triangular prism or a hexagonal prism. The base body unit can be formed by bonding a plurality of base bodies having such shapes. Alternatively, the base body unit can be formed by bonding base bodies having different shapes (the triangular prism and the quadrangular prism, for example).

PRIOR ART REFERENCE

Patent Reference

Patent reference 1: Japanese Patent Publication 2012-92688

What is claimed is:

1. A heat collector for solar thermal power generation comprising:
    a base body made of a silicon-carbide ceramic sintered body in which a channel for passing through a heat medium is formed;
    a first glass layer of silicate glass that coats at least apart of surfaces of the base body and contains an alkali metal constituent and/or an alkaline-earth metal constituent; and
    a second glass layer of silicate glass that coats the first glass layer and has a sum of contents of an alkali metal constituent and an alkaline-earth metal constituent, which is smaller than a sum of contents of the alkali metal constituent and the alkaline-earth metal constituent in the first glass layer.

2. The heat collector for solar thermal power generation according to claim 1,
    wherein the sum of the contents of the alkali metal constituent and the alkaline-earth metal constituent in the second glass layer is equal to or lower than 3.6% by mass in terms of oxide.

3. The heat collector for solar thermal power generation according to claim 2,
    wherein the base body has a honeycomb structure including a plurality of cells partitioned by partition walls extending in a single direction and aligned in rows and each cell configures the channel.

4. The heat collector for solar thermal power generation according to claim 2,
    wherein a plurality of base bodies are bonded through bonding layers so as to form a base body unit, and
    the first glass layer covers surfaces of the base body unit.

5. The heat collector for solar thermal power generation according to claim 4,
    wherein the base body has a honeycomb structure including a plurality of cells partitioned by partition walls extending in a single direction and aligned in rowa and each cell configures the channel.

6. The heat collector for solar thermal power generation according to claim 1,
    wherein a plurality of base bodies are bonded through bonding layers so as to form a base body unit, and
    the first glass layer coats surfaces of the base body unit.

7. The heat collector for solar thermal power generation according to claim 6,
    wherein the base body has a honeycomb structure including a plurality of cells partitioned by partition walls extending in a single direction and aligned in rows and each cell configures the channel.

8. The heat collector for solar thermal power generation according to claim 1,
    wherein the base body has a honeycomb structure including a plurality of cells partitioned by partition walls extending in a single direction and aligned in rows and each cell configures the channel.

* * * * *

UNITED STATES PATENT AND TRADEMARK OFFICE
CERTIFICATE OF CORRECTION

PATENT NO.         : 9,857,100 B2
APPLICATION NO.    : 14/760594
DATED              : January 2, 2018
INVENTOR(S)        : Taketomo Kageyama et al.

Page 1 of 1

It is certified that error appears in the above-identified patent and that said Letters Patent is hereby corrected as shown below:

In the Claims

In Claim 1 in Column 12 on Line 58 the word, "apart" should be two words, --a part--

In Claim 5 in Column 14 on Line 1 the word, "rowa" should be --rows--

Signed and Sealed this
Fourteenth Day of August, 2018

Andrei Iancu
*Director of the United States Patent and Trademark Office*